United States Patent [19]

Aquino et al.

[11] Patent Number: 4,733,768

[45] Date of Patent: Mar. 29, 1988

[54] SELECTIVE EJECTION CONVEYORS

[76] Inventors: Agostino Aquino, 182 Cumberland Ave., Paterson, N.J. 07502; Nicholas Polifroni, 16 Edgewater Rd., Cliffside Park, N.J. 07010

[21] Appl. No.: 804,437

[22] Filed: Dec. 4, 1985

Related U.S. Application Data

[63] Continuation-in-part of Ser. No. 772,398, Sep. 4, 1985.

[51] Int. Cl.4 ............................................. B65G 47/46
[52] U.S. Cl. ................................... 198/369; 198/365; 198/494; 198/817; 198/841
[58] Field of Search ............... 198/369, 365, 366, 362, 198/494, 817, 837, 841, 372

[56] References Cited

U.S. PATENT DOCUMENTS

| | | |
|---|---|---|
| 828,296 | 8/1906 | Baldwin . |
| 1,762,772 | 6/1930 | Fisher . |
| 2,497,874 | 2/1950 | Evans et al. . |
| 2,675,118 | 8/1952 | Morrison . |
| 3,354,613 | 11/1967 | Anderson et al. . |
| 3,404,775 | 10/1968 | McClellan . |
| 3,428,416 | 2/1969 | Provost et al. . |
| 3,429,417 | 2/1969 | De Good et al. ................... 198/837 |
| 3,640,372 | 2/1972 | Sarring . |
| 4,003,462 | 1/1977 | Perrott . |
| 4,011,935 | 3/1977 | Massey ................................ 198/369 |
| 4,130,193 | 12/1978 | Bourgeois . |
| 4,166,525 | 9/1979 | Bruno . |
| 4,424,966 | 1/1984 | Chandhoke . |
| 4,426,074 | 1/1984 | Fischer . |
| 4,499,988 | 2/1985 | Gasser . |
| 4,553,658 | 11/1985 | Gasser . |
| 4,585,227 | 4/1986 | Müller ................................ 198/365 |
| 4,598,814 | 7/1986 | Felder . |

FOREIGN PATENT DOCUMENTS

| | | |
|---|---|---|
| 1246546 | 8/1967 | Fed. Rep. of Germany ...... 198/494 |
| 2108023 | 8/1972 | Fed. Rep. of Germany . |
| 2518776 | 11/1976 | Fed. Rep. of Germany ...... 198/841 |
| 2803223 | 7/1978 | Fed. Rep. of Germany . |
| 2831323 | 1/1980 | Fed. Rep. of Germany . |
| 2481959 | 11/1981 | France . |
| 1257753 | 12/1971 | United Kingdom . |

Primary Examiner—Robert J. Spar
Assistant Examiner—Lyle K. Kimms

[57] ABSTRACT

The invention is a support for a chain for a selective diverting device for diverting an individual cookie from one conveyor belt path to another location. It is preferably used in combination with a sensing device, such as a weigher, optical sensor, color sensor, or the like, the sensor selecting out "rejected" articles and actuating the diverting member.

16 Claims, 12 Drawing Figures

SELECTIVE EJECTION CONVEYORS

CONTINUING DATA

This application is a continuation-in-part of U.S. patent application Ser. No. 772,398, filed Sept. 4, 1985, entitled "SELECTIVE EJECTION CONVEYOR".

BACKGROUND OF THE INVENTION

The invention relates to ejection devices for use in a production line. This invention also relates to devices for supporting a movable endless chain and the like.

This invention may be used with conveyers having a plurality of rows of articles and especially food articles.

It is well-known to use sprockets and rollers for use with chains, so as to support an endless chain or belt for movement through an endless path. It is also well-known to use sprocket teeth to engage the spaces between the individual elements forming a typical chain. Such chains are commonly used with bicycles, and such chains have the advantage of being relatively, precisely controllable through the use of individual sprocket teeth, and durable.

It is well-known to use pivoting numbers in connection with conveyer belts. The Prior Art pivoting members for use with conveyer belts cannot be used with multiple rows which are closely spaced, without suffering sufficient downtime loses do to breaking of an individual one of the conveyer belts. Maintenance of and replacement of a single individual conveyer belt on a pivoting section in the Prior Art would require removal of the entire drive shaft, making necessary extensive disassembly and re-assembly operations where the individual belt is for example between other conveyer belts rather than on the end. This lack of accessability, in a practical sense, limits the number of rows of articles which can be handled by such a pivoting conveyer system. Also, since the Prior Art pivoting conveyor members are difficult to maintain when a belt breaks, they may be undesirable for use in a high production system where there is only limited storage for articles coming off the conveyor belts, and which articles cannot be processed during the maintenance time. Furthermore, the Prior Art pivoting conveyor belts do not provide for rapid replacement of an integral belt, but would require use of a spliced belt which is stretched around the rollers and then joined in place. Such spliced belts do not last as long as integral belts which have been formed as a continuous band.

The U.S. Pat. No. 3,404,775 to McClellan shows in FIG. 2 a linearly-movable arm 22 which causes pivoting of an arm 18 which in turn causes pivoting of a conveyor belt 25. Pivoting causes dropping of a brick between two adjacent conveyor belts, as seen in FIGS. 2 and 3. It is noteworthy from an inspection of FIGS. 3 and 4 that two different pivoting conveyor belt sections must be pivoted in order for a brick 51 to drop. This is a result of the parallel adjacent members 56, 58 and 60, 62, as well as members 57 and 59 which are adjacent to members 61 and 65. These pivoting conveyor belt segments can be actuated by electrical, pneumatic, or other signals to drop selected bricks upon crosswise-moving belts to classify bricks according to color, finish, or other characteristics. However, this patent does not teach or suggest mounting a plurality of closely-spaced conveyor belt members for selective pivoting (or other movement) out of a conveyor belt path to permit dropping of selected articles, wherein the closely-spaced conveyor belts are driven in such a manner as to render any single one of the closely-spaced conveyor belts replaceable with a continuous band conveyor belt rather than a spliced conveyor belt.

The U.S. Pat. No. 4,426,074 to Fischer teaches a pivoting conveyor belt segment having an actuator 14, for clearing spoiled items from an overlapped stream of paper products. A three-flight conveyor belt transporting system is rocked bodily, so as to have an upper and a lower position, so that a continuous stream of spoiled items can be transferred downwardly under the next flight to a separate delivery. FIGS. 1 and 2 are illustrative, and show a sensor 17 such as a photoelectric cell together with a processing unit 18 capable of actuating a solenoid of valve 15, so as to drive cylinder 14. However, there is not teaching or suggestion of a plurality of commonly-driven conveyor belt segments which are selectively movable out of a conveying relationship and which are so connected with a drive means that any single belt can be replaced with a continuous belt without removing any other parts.

The U.S. Pat. No. 4,424,966 to Chandhoke teaches a cylinder 144 which causes pivoting of a conveyor belt segment 32 between rolls 46 and 54, between an upper conveying and a lower position. When the conveyor belt 32 is in the lower position, a member 134, 136, which is a rake, forms a bridge between the pulleys 46 and the T-shaped member 98 to support the books from the binder 12 on the upstream portion 30 of the conveyor 20. The articles so supported by the rake are thus in place ready to move the conveyor end portion 32 returns to its horizontal position. However, there is no teaching of a plurality of commonly-driven conveyor belt segments which are selectively movable out of a conveying relationship and which are so connected with a drive means that any single belt can be changed without removing any other parts, thereby permitting the use of continuous belts.

Other patents showing related types of conveying and diverting devices are shown in U.S. Pat. Nos. 4,166,525; 3,640,372; 4,499,988; 4,130,193; 3,354,613; 1,762,772; 828,296; and 2,675,118.

SUMMARY OF THE INVENTION

The invention is to a selective diverting device for diverting an individual cookie from one conveyor belt path to another location.

In a particular aspect of the present invention, a sprocket drive gear is used to drive a chain along an endless path, the chain being used for conveying articles along a surface. In the present invention, an inventive feature is the provision of a solid block of material rather than rollers for supporting the endless chain in about various curves. The use of a solid block, having a raised ridge for guiding the chain and supporting it upon the central chain connecting link, results in reduced maintenance time, and, where a low-friction material such as a plastic is used, can also result in reduced operating expenses.

It is preferably used in combination with a sensing device, such as a weigher, optical sensor, color sensor, or the like, the sensor selecting out "rejected" cookies and actuating the diverting member.

The diverting member itself comes in three embodiments, all similar, and a fourth embodiment which is somewhat different. The first three embodiments include a pivotable conveyor-belt device which is automatically actuated (as by a piston or the like) to pivot out of the main conveyor belt path when a "reject" articles is located thereon. In the fourth embodiment, the "reject" conveyor belt is a retractable device, not pivotable, and is for articles having a greater length than the spacing between two rollers (since relatively large gaps occur in this embodiment).

In a separate aspect of this invention, due to the need for a plurality of narrow diverting belts to operate on cookies from a single large conveyor belt, a drive means is used which forms a separate aspect of the invention to be searched. In this aspect of the invention a single long drive shaft has multiple gears, each gear engaging a driven gear on the diverting belts. This arrangement is necessary so that continuous, rather than spliced, conveyor belts can be stretched into place for maintenance and repair operations. Thus, there is a clearance between the drive shaft and the nearest portion of the conveyor belt, so that a new conveyor belt can be snapped over the rollers for replacement at any time, without removal of any of the other diverting belt parts.

In one embodiment of the present invention, a pneumatic cylinder is selectively actuatable to cause pivoting of a support member about the drive shaft. A drive shaft has a drive gear which is in driving relation to a driven gear, the driven gear being operatively attached to a roller for a belt. Other rollers are provided, as well as a tensioning roller for maintaining tension in the belt. Each of the other rollers completing the conveyer belt circuit are rotatably mounted upon the support plate. An end of the pneumatic cylinder is pivotably connected to the support member, and the other end of the pneumatic cylinder is pivotably connected to a fixed support. The end of the driven cylinder which supports the belt is open, as are the other rollers which support the belt, so that a conveyer belt can be removed or placed over the rollers without disassembly of any of the rollers or other parts. Thus, a continuous conveyer band such as a nylon belt, can be used for prolonging a period between required belt changes due to worn or broken bands. A new continuous belt can be used to replace a broken belt without disassembly of any other parts.

The diverting member is placed in bridging relationship between two conveyers belts, each conveyer belt having multiple rows and columns of articles thereon. In response to a sensed attribute of the articles such as overweight or underweight, color of the article, or sensed information regarding the shape and composition of the article, among other measurable attributes, an individual article can be ejected by pivoting motion of the selective diverting device away from the bridging relationship, so that the selected article passes in between the two stationary conveyor belts, whereupon the diverting member is returned to its bringing relationship.

In another embodiment of the invention, a tensioning roller is omitted, and instead of flat conveyer belts, round conveyer members having circular cross-sectional shapes, are used.

In another embodiment, the support member is not mounted about the drive shaft, but rather a slotted guide member is used which is fixed to a stationary support. In this embodiment, the bridging portion of the conveyer belt is an end of the conveyer belt which is curved about an end roller. The support plate rotatably supports the end roller as well as the driven roller, the support plate having a follower member attached thereto for following the slot of the slotted member. Another plate can be used to pivotably fix the drive roller to the driven roller during pivoting motion thereof. An actuating member such as a pneumatic cylinder can be used to position the end roller either in bridging relationship or in non-bridging relationship between two stationary conveyer belts. The actuating member causing linear movement of the support member and the driving gear attached about the drive shaft remains in contact with the driven gear throughout. A small amount of angular motion of the support plate occurs due to the motion of the driven gear relative to the drive gear. The conveyor belt support rollers, namely the end roller and the driven roller, are rotatably mounted to the suport member such that the conveyer belt can be removed and replaced without disassembly of any other parts.

A computer or signal processor can be used in combination with any known type of sensor appropriate for the articles conveyed, in order to selectively actuate any one or ones of the diverting members to permit diversion of individual selected articles.

DETAILED DESCRIPTION OF THE INVENTION

Figure 1:
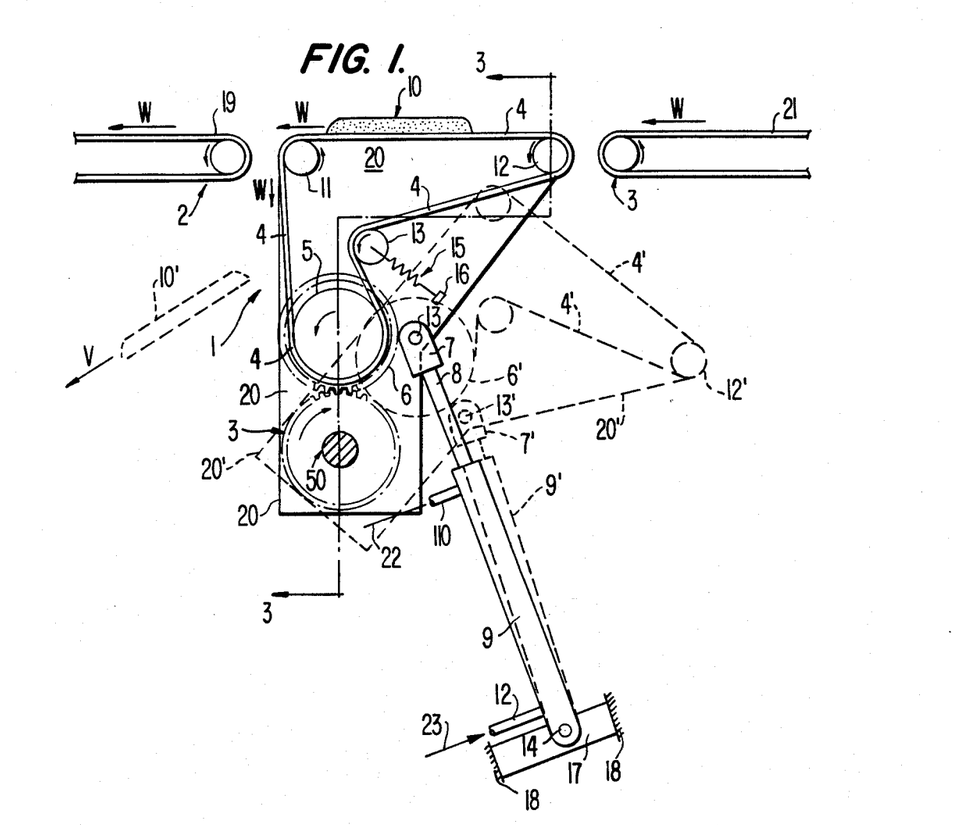
FIG. 1 shows a front elevational view of a diverting member used in the present invention.

FIG. 1 shows the front elevational view of a diverting member 1. The diverting member 1 includes a support plate 20. The support plate 20 is closely rotatably mounted about a drive shaft 50. The support plate 20 is pivotally connected by a pin 13 to a collar 7. The collar 7 is supported by a shaft 8 and an air cylinder 9.

The air cylinder 9 in the preferred embodiment is a Clippard pneumatically-driven cylinder UDR-12 having a ¾ inch bore and a 2-inch stroke. The air cylinder 9 is preferably double acting so as to provide a positive force for moving the shaft 8 in both directions. The air cylinder 9 is pinned at its lower end by a pin 14 to a support member 17 connected to a fixed support 18 represented schematically in FIG. 1. The air cyclinder 9 has an upper air inlet 110 and a lower air inlet 12. Air flow is indicated schematically by arrow 22 and arrow 23 for respective inlets 110 and 12.

The diverting member 1 is in bridging relationship between a downstream conveyor belt 2 and an upstream conveyor belt 3. The conveyor belt 2 has a belt 19, and the conveyor belt 3 has a belt 21. Both of the belts 19, 21 move with a speed W as indicated by the arrows in FIG. 1; however, it is contemplated as being within the scope of the present invention that the conveyor belts 19 and 21 may move differing speeds, which differing speeds can be used to adjust the spacing between articles. It is also contemplated as being within the scope of the present invention that the conveyor belt 4 can move at different speeds than the belts 19 and 21, if desired. As seen in FIG. 1, an article 10, such as candy bar or other article, has passed from conveyor belt 21 and onto a conveyor belt 4 which is part of the diverting member 1.

The conveyor belt 4 is supported by a roller 11 and a roller 12, both of which are rotatably mounted for rotation about each respective roller axis, upon the plate 20. Additionally, a tensioning roller 13 is slidably and rotatably mounted for contact with the belt 4 by a spring member 15 which is fixably connected at its other end to a support block 16. The support 16 in turn is fixed to the pipe 20. The tensioning roller 13 is not necessary and omission of a tensioning roller from any embodiment shown, or inclusion with any embodiment, is contemplated as being within the scope of the present invention.

A gear 6 is rotatably fixed about its axis to the plate 20, and is fixedly connected against relative rotation to a driven roller 5. Any alternative means of connection can also be used, such as reduction gearing, or other connecting means between the gear 6 and the roller 5. A drive gear 3 is in contact with the driven gear 6, the drive gear 3 being fixedly connected as by a pin, welding, or the like to a drive shaft 50. Thus, the drive gear 3 rotates relative to the plate 20 but gear 3 is fixed to the shaft 50 for rotation therewith.

While an air cylinder has been described in the preferred embodiment, any actuating device can be used instead, such as a solenoid, a magnetically-actuated device, or a mechanical device, or any other device capable of moving the device 1 between two positions. The air supply to either the top or the bottom air cylinder 9 is supplied from an air supply. Flow into or out of the port 110 and 12 is preferably valved by a solenoid-actuated valve or the like. An air cylinder 9 has been chosen in the preferred embodiment for maintainability and reliability, however any other actuating devices can be used in the present invention.

Further, while a plate 20 is shown, any support structure can be used instead, including curved, prismatic, or other shapes; and any forming means can be used for the member 20 or alternatives thereof, including but not limited to molding, casting, cutting, metalworking, or other forming means.

The support plate 20 is preferably made of strong, light-weight material such as aluminum, but it can also be made of steel, plastic, wood, or any other material sufficiently strong to support rollers and a conveyor belt. The rollers are preferably any conventional roller formed of wood, plastic, steel, aluminum, or the like and are mounted for rotation by bearing members. Such bearing members may include, for example, a low-friction material such as nylon or Teflon, ball bearings, journal bearings, or any other type of bearing known to those skilled in the bearing art. The belt 4 is preferably a flat urethane endless belt, such as those well-known in the art. However, any type of belt and belt material, including woven cloth, plastic, rubber, steel mesh or the like can be used with the present invention. Furthermore, while endless belts are preferred in the present invention for greater reliability and longer life, seamed belts can be used as well. Such seamed belts are usually made by splicing or by similar operations, and are generally inherently weaker and have a shorter life than endless belts which have no seams.

FIG. 1 shows the second position of the diverting member 1 in dotted outline. The gears 3 and 6 have meshing teeth (the teeth or omitted from the drawings for clarity). As seen by the dotted outline the gear 6 pivots to its position indicated by 6', which remains in toothed, engaging contact with the gear 3. The gear 3 does not rotate with the plate but rather with the shaft. Therefore, the roller 3 remains in driving relationship with the gear 6 throughout the pivoting operation.

When the diverting member 1 is in its second, diverting position as indicated in dotted line, a subsequent article 10' passes between the conveyors 2 and 3 as indicated by the position shown in dotted outline in FIG. 1. The article 10' is indicated as having a velocity V, which is a combination of a forward velocity W and a downward component of velocity due to gravity.

The diverted article can fall downwardly into any type of receptace. Furthermore, the diverted article 10' can fall upon a chute, another conveyor belt, or a shredder, among other devices, for further processing. All such further steps are contemplated as being within the scope of the present invention.

The diverting member 1 remains in its initial position shown in solid outline in FIG. 1 until a signal is received to divert an article 10', whereupon a diverting member 1 is moved to its second position as shown in dotted outline. After the article has been diverted, the air cylinder 9 is actuated to return the diverting member 1 to its first position as shown in solid outline.

Figure 2:
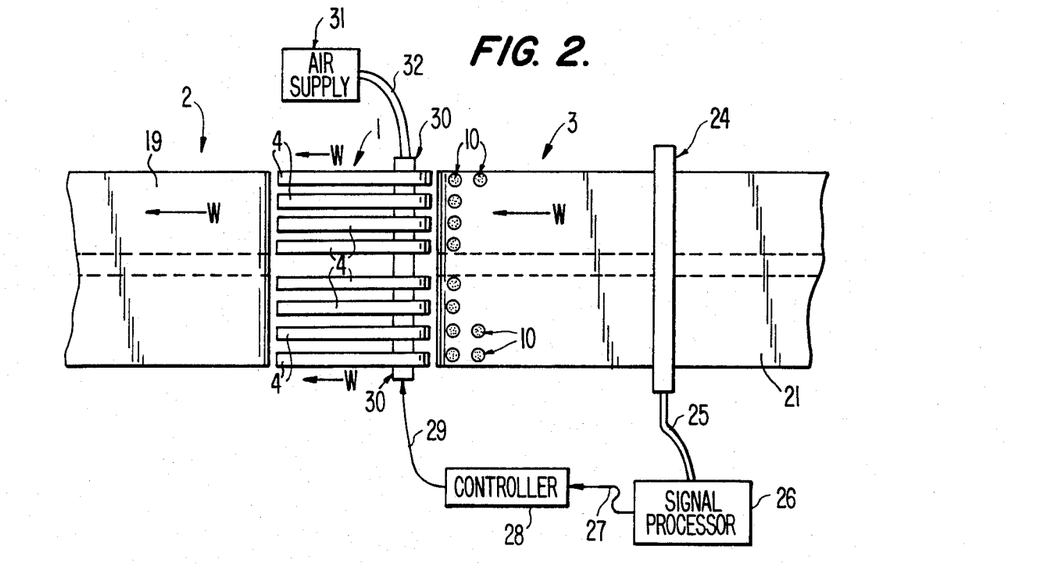
FIG. 2 is a top elevational view of the diverting device according to the present invention.

FIG. 2 is a top elevational view of the diverting member 1, and the conveyor belts 2 and 3. Schematically indicated in FIG. 2 is a sensing device 24 for sensing each of the individual ones of the articles 10, and a signal processor 26 for processing signals received from the sensor 24. A controller 28 is also schematically indicated, for controlling a mechanism 30 which selectively actuates any one or ones of the air cylinders 9 to act upon respective diverting members 1. Also indicated schematically is an air supply 31 for supplying air to the air cylinders 9. Any air supply source, such as a storage tank, compresser, or the like can be used in the present invention.

The conveyor belts 2 and 3, as well as the diverting members 1, are shown as being broken way in dotted outline along a longitudinal centerline. The broken away portion indicates that an arbitrary number of additional members or additional width of conveyor belt can be used, as appropriate. Also, a lesser number of rows and a lesser number of diverting members, as well as a lesser width of conveyor belt, can be used. All such variations are contemplated as being within the scope of the present invention. In the preferred embodiment, twenty four diverting members are arranged to be driven simultaneously by a single shaft 50. Each diverting members 1 receives articles from a single row of articles from the conveyor belt 21. When an article 10 to be diverted is sensed by the sensing member 24, the signal processor 26, having received signals along the pathway 25, determines the appropriate time for actuating a diverting device 1, and also selects one of the diverting devices 1 to be actuated. More than one diverting member 1 can be actuated selectively simultaneously, depending upon the articles 10 arriving at the diverting devices 1. The signal processor 26 takes into account the belt speed W of the belt 21, the position of the sensed article 10 which is to be diverted, and computes the desire to time at which the particular diverting device 1 is to be actuated.

The signal processor 26 in the preferred embodiment is a computer. Instructions are preferably programmed into the computer, which preferably compares the sensed information about the articles 10 with predetermined "acceptable" range for the particular attribute sensed. For example, if color is sensed, a particular degree of browning, or a particular shade of color may be optimum, but there is ordinarily an acceptable range of browning, or of colors, such that outside the range, articles 10 are to be rejected. Additional sensors can also be employed, for example, weight, shape, composition, etc., which sensors also would send signals to the signal processor 26. Thus, any number of sensing devices can be used, such as an ultrasonic thickness measuring device, an infrared scanner, a television camara, a salinity meter, a magnetic sensor, or the like can all be used. Thus, any number of sensing devices can be employed, the signal processor 26 accepting signals from all of the sensors and diverting articles 10 if the individual article 10 to be diverted fails to fall within the predetermined range of values sensed by the sensing devices 24.

The signal processor 26 can preferably include a vision processor for comparing image information received from imaging devices such as television cameras or the like, and comparing the images to a number of predetermined acceptable images, for determining whether or not to divert a particular article 10. The signal processor computes, based upon empirical data, theoretical equations, and other sensed imputs such as conveyor belt speeds of the belts 21 and 19, as well as any other conditions which are to be sensed, and sends its processed output signals (decisions) by pathway 27 to a controller 28.

Controller 28 can also be a computer, or it can be an analog controlled device. Furthermore the controller 28 can be a part of the signal processor 26 if desired. The controller 28 supplies signals and/or power to actuate individual ones of the diverting members 1 shown in FIG. 2. Such controllers are well-known in the art, and any controller for selectively actuating one of a plurality of actuatable devices can be used with the present invention. In the preferred embodiment, the controller supplies electrical power to solenoids which control air flow to the individual air inlets 110 and 12 of the cylinder 9.

While a preferred embodiment of actuator 9 controller 28 signal processor 26 and sensing devices 24 have been described and illustrated, the present invention is not limited thereto but encompasses any and all equivalent structures known to those skilled in the respective arts. The pathways 25, 27, and 29, as well as the air supply conduit 22, are schematically illustrated and would include any appropriate conduit for the device chosen. For example, the conduits 25, 27 and 29 are preferably electrical cables or cords where the sensing devices 24 have electrical outputs and where the signal processor 26 and the controller 28 have electrical operating elements. For an analog control system, however, a fluidic computer might be used, or analog control elements could be used as well.

Figure 3:
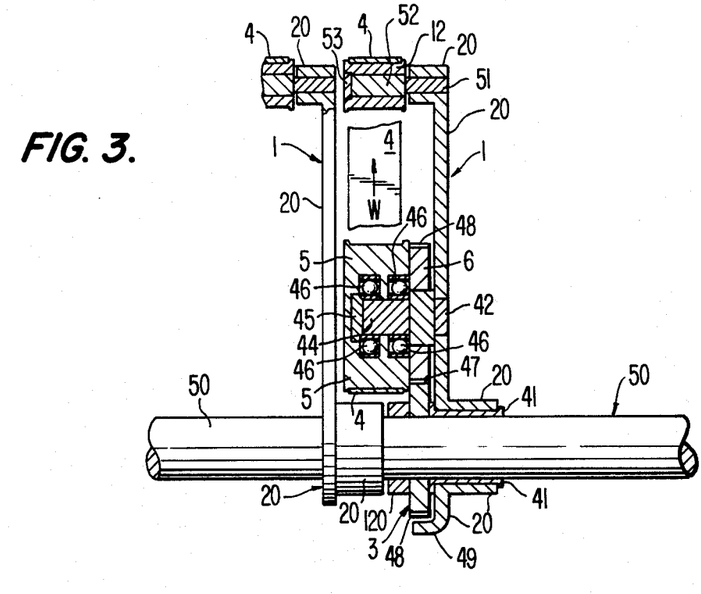
FIG. 3 is a side view, partially in section, along line 3—3 of FIG. 1, showing two diverting members arranged as used.

FIG. 3 is a sectional side view of a diverting member 1 taken along the line 3—3 of FIG. 1. Also shown to the left in FIG. 3, in side elevational view partially broken away at the upper portion, is another diverting member 1, showing the nesting relationship of the adjacent diverting member 1 and also showing the clearance between an end of a belt-carrying roller 5 and the support plate 20 of the adjacent diverting member 1. Also shown broken way at each end is the drive shaft 50 which drives each of the respective gears 6 of the respective diverting members 1.

As seen in FIG. 3, the plate 20 has a collar portion 20 disposed about the shaft 50. In the preferred embodiment, a low-friction member 41, such as a nylon sleeve or the like, is fixed in between the collar of the member 20 in the shaft 50 to permit relative rotation between the shaft 50 and the plate 20.

The plate 20 supports a shaft 51 which is fixed thereto, the shaft 51 rotatably supporting the roller 12. This is schematically indicated in FIG. 3, with a cross-section of the flat belt 4 being visable atop the roller 12 in FIG. 3. A portion of the belt 4, partially broken away at either end, is visible in FIG. 3 between roller 5 and 12. The roller 5 is mounted by bearings 46 to a shaft 44. An end member 45 retains the roller 5 in position along the shaft 44. A shaft 42 is connected to the shaft 44 as well as rotatably supporting the gear 6. The gear 6 meshes with the gear 3 which is pinned or welded to the shaft 50. Any means of attachment of the gear 3 may be used, such as keying, glueing, ultrasonic welding or the like, which are within the ambit of a skilled artisan.

The collar portion of the plate 20 serves to maintain the plate 20 against angular movement relative to the shaft except for rotational movement within a plane perpendicular to the axis of the shaft as indicated in FIG. 1. Thus, the plate 20 can rotate about the shaft 50 in a single plane between the two positions shown in FIG. 1 namely the solid position and a dotted-outline position.

The gear 3 is retained also by a collar 120 which prevents sliding movement along the shaft 50. There is a clearing between the top of the collar 120 and the belt 4 just above it as seen in FIG. 3. Thus, there is a clearance for replacing a belt 4, the clearance being between adjacent diverting members 1 as well as between the bottom of the roller 5 and the top of the collar portion of support member 20, as well as the top of the collar 120 as seen in FIG. 3. Thus, a belt can be placed around the rollers 11, 12, 13, and 5 without removal of any parts or elements of the diverting members 1, and does not require removal of the shaft 50. This is despite the very close spacing between adjacent diverting members 1 which is seen in FIG. 3. This close spacing of belts 4 atop the diverting members 1 is necessary where there are closely spaced articles arriving from the conveyor belt 21 (shown in figure 2).

The roller 12 is mounted in a similar manner to the rollers 11 and 13, which is shown in FIG. 3 as including a support shaft 52 which is rotatable relative to the roller 12, and a stop member 53 which retains the roller 12 on the shaft 52. The shaft 52 can be made of a low-friction material such as Teflon, nylon, or the like, or it may include ball bearings or other bearing surfaces such as a journal bearing.

Furthermore, the shaft 52 may be integral with the roller 12 and the shaft 51 then be made rotatable and journaled or otherwise made rotatable relative to the plate 20 within which it is received.

Figures 4, 5:
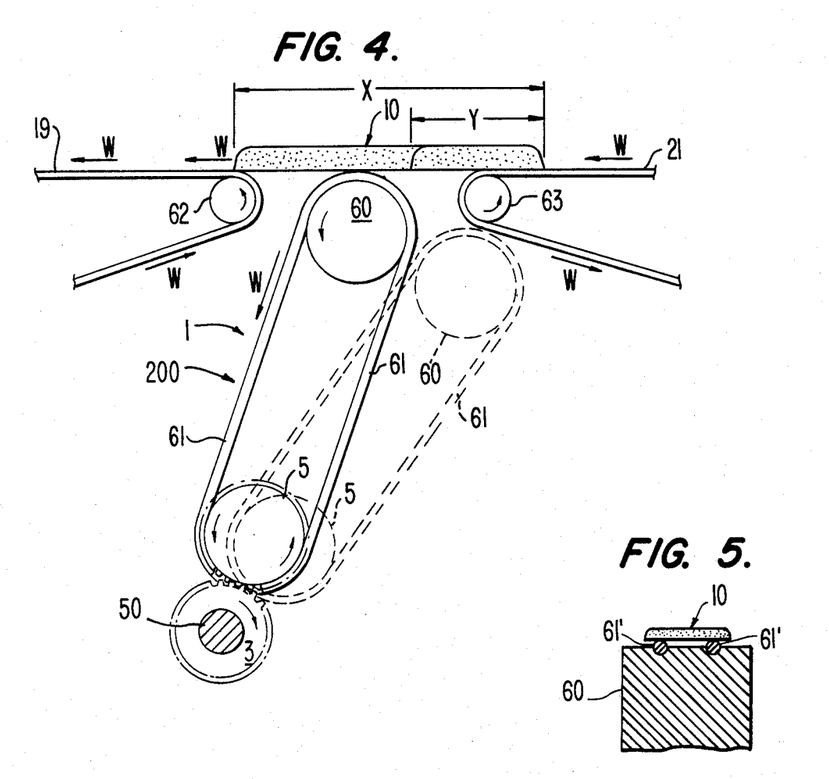
FIG. 4 is a front elevational view of an alternative embodiment of a diverting device.
FIG. 5 is a side sectional view showing an alternative belt arrangement.

FIG. 4 is a front elevational view of another embodiment of an alternative diverting member 200. The diverting member 200 would be supported by a similar support plate 20 (not shown in FIG. 4 for clarity) and be actuated by a similar actuator 9. However, rather than the surface of a belt 61 being used to bridge the gap between adjacent conveyor belts 19 and 21, rather the curved end of a roller 60 having a belt thereacross is used. Here, no tensioning roller is used, although if desired a tensioning roller can be provided. In FIG. 4 there is seen an article 10 which is overlying the roller 63 and having a portion in the gap between the rollers 62 and 63. For this embodiment, the permissible range of articled sizes is indicated as follows. The smallest article has a length Y, and the longest article has a length X. Between the range of sizes (between the lengths X and Y), articles can be diverted by pivoting the diverting member 200 to the position shown in dotted outline in FIG. 4. In the dotted outline position the diverting member 200 is no longer in bridging relationship, and the article 10 can fall in the gap between 62 and 63. When the article has been diverted, the diverting member 200 is returned to its bridging position shown in solid outline.

The belt 61 used with the diverting member 200 is preferably not a flat belt but rather a pair of round belts. FIG. 5 shows a cross-sectional view of the mounting of the round belts on roller 60. The round belts 60', 61' together support an article 10. Here, the article is preferrably an edible article such as a candy bar of a cookie or the like. However, any other article can be diverted by the diverting device 200, and the present invention is not limited to use with edible articles, candy bars, or cookies but encompasses all articles capable of being conveyed by any conveying means.

Figure 6:
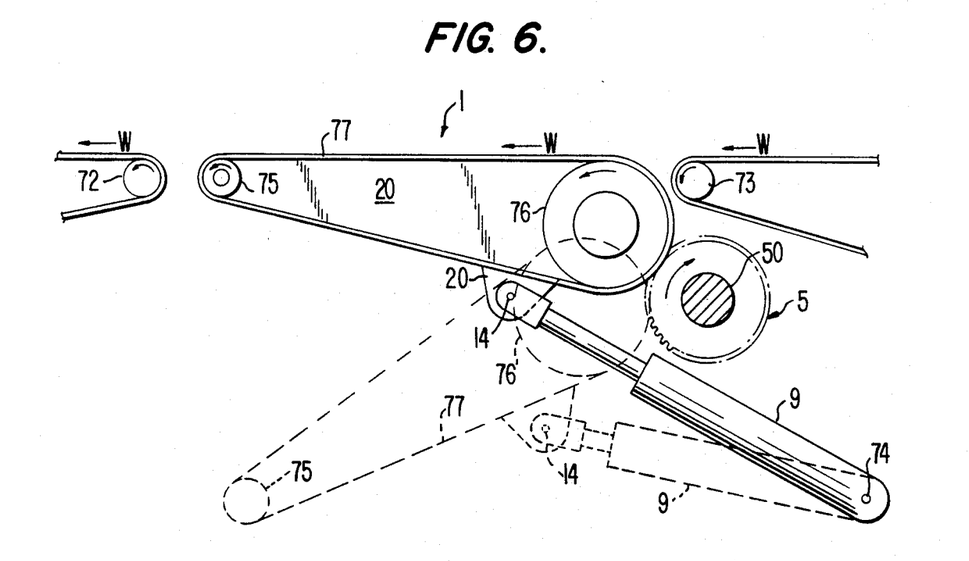
FIG. 6 is a front elevational view, partially in section, of another embodiment of the diverting member.

FIG. 6 is a front elevational view, partially in section, showing another embodiment of diverting member 1. Here also, a support plate 20 is used to maintain separation between rollers 75 and 76. A gear, hidden behind roller 76 but attached thereto for rotation therewith, is in engaging contact with gear 5 which is fixed for rotation with shaft 50. The shaft 50 is shown in section in FIG. 6, since the shaft 50 extends perpendicularly to the plane of the drawing for driving other diverting members. The diverting device 1 is in bridging relationship between a pair of rollers 72 and 73.

A pnuematic cylinder 9 is fixed to the plate 20, in pivoting relationship by a pin 14. The pneumatic cylinder 9 is also pinned at its other end by a pin 74, so that, upon change in the distance between 14 and 74, the diverting member 1 pivots to the position shown in dotted outline in FIG. 6, as does the position of the pneumatic cylinder 9. Thus, the belt 77 carried by the rollers 75 and 76 in FIG. 6, is in bridging relationship between the rollers 72 and 73. The belts associated with the respective rollers 72, 75 and 76, and 73 need not move at the same respective speeds, but rather each can have its own speed. A single selected speed W has been selected for convenience, where the spacing between the articles is not to be changed. However, with different belt speeds, the spacings between articles can be increased or decreased by appropriate adjustment of the speeds of the various conveying members.

The miscellaneous conventional elements such as bearings, and alike, can be those as shown in FIG. 3, or any other suitable bearing and other elements can be used, for example nylon bushings can be used for an anti-friction surface and the like. Again, the plate 20 extends about the shaft 50, so that it is relatively rotatable thereto. Also, the plate 20 portion passing about the shaft 50 is also relatively rotatable relative to the gear 5. Such arrangement can preferably be similar to that shown in FIG. 3, however any equivalant structure or alternatives which would be known to anyone having ordinary skill in the art, are contemplated as being within the scope of the present invention.

As seen in FIG. 6, in the solid-outline position the diverting member 1 is in bridging relationship and is capable of carrying articles from the conveyer belt supported by roller 73 and on on to conveyer belt 77, once the articles pass to the conveyer belts supported by roller 72. In the dotted outline position of the diverting member 1, shown in FIG. 6, the diverting member 1 is no longer in bridging relationship between rollers 72 and 73, thereby permitting a selected article to pass between the rollers 72 and 73 and downward, rather than onto the conveyer belts supported by roller 72.

The pneumatic cylinder 9 is preferrably of the double acting type, having a positive forward thrust as well as positive reverse thrust, similar to the pneumatic cylinder shown in FIG. 1 which has an inlet passage 110 and an inlet passage 12 for passage of air. Also, as discussed with reference to the other embodiment, solenoids or other controls can be used to control the action of the cylinder 9, so as to control the position of the diverting member 1 between its solid-outline position and its dotted-outline position. Such solenoids are actuated either manually or by a controller 28 such is as shown in FIG. 2. However, any known control means for moving a divertng member from its solid-outline position to a dotted outline position is contemplated as being within the scope of the present invention. Such means might include electromagnetic, mechanical, pneumatic, manual, or the like actuating means.

Figure 7:
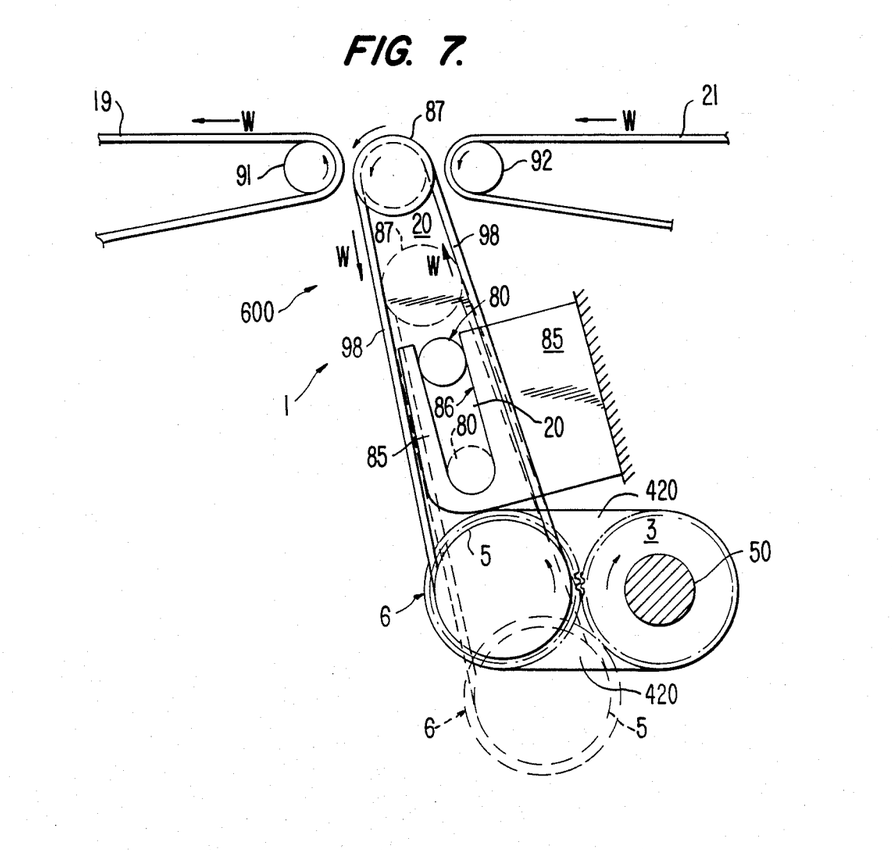
FIG. 7 is a front elevational view of another embodiment of the diverting member.

FIG. 7 is a front elevational view of an alternative embodiment of the diverting member according to the present invention. Here, the diverting 600 has a roller 87 and belt 98 which bridges a gap between rollers 91 and 92. The belt 98 is preferably similar to belt 61' having a round cross-section, with grooves being formed in the roller 87 for receiving a pair of such belts 98 similar to that shown in FIG. 5.

Here, due to space limitations and the close spacing of the rollers 91 and 92 to the roller 87, relatively small articles can be selectively diverted. This is possible due to the very small gaps between the roller 87 and the roller 92, as well as betweem the roller 87 and the roller 91. Due to this close tolerance, the roller 87 must be retracted substantially downwardly, rather than being pivoted through an arc. Here, the supporting structures are somewhat different from the previous embodiments, however a similar actuating means 9 can be used on either the support plate 20 or the auxiliary support plate 420 discussed hereunder.

The support plate 20 pivotably supports rollers 87 and 5. No belt slack take-up roller is provided, although use of such take-up roller together with any other rollers desired is contemplated as being within the scope of the present invention. Also, the support plate 20 is not extended to encompass and surround the shaft 50, but rather terminates without encircling the shaft 50. A follower 80, which may be a fixed or rotatable member which is attached to the plate 20, is made and adapted to follow a slot 86. The slot 86 is formed in a guide plate 85, the guide plate 85 being fixed to a support which is stationary with respect to the parts shown. This support is indicated schematically in FIG. 7.

As seen in FIG. 7, the slot 86 serves to guide the motion of the plate 20 as the follower descends to its lower most position indicated in dotted outline in FIG. 7, and returns to its upper most position shown in solid outline in FIG. 7. The dotted outline position of the roller 87 indicates that a gap is left between the rollers 91 and 92 to permit diverting of articles 10 passing from conveyor belt 21.

Another support plate 420 passes about the shaft 50 and is pviotally connect, as by pinning, or the like, to the plate 20 at a location which is colinear with the axis of the roller 5. Thus, the plate 420 is pivotable about the shaft 50, and is moveable relative to the gear 3, and is pivotable relative to the plate 20. Furthermore, the plate 420 is pivotable relative to the gear 6 and relative to the roller 5. Thus, the plate 420 serves only to retain the gear 6 in contact with the gear 3 during movement of the gear 6 to its dotted outline position shown in FIG. 7. An actuator, such as actuator 9 shown in FIG. 1, can be provided and attached either to the plate 20 or to the plate 420, since the linkage as shown including slot 86, plate 20 and plate 420, permit movement of the plate 20 and associated rollers from the solid outline position to the dotted outline position. The cylinder 9 can be pinned to a fixed support at one end and pinned for pivoting either to the plate 20 or to the plate 420 as desired, and such positioning of an actuating member such as the cylinder 9 would be a conventional design expedient known to any one having ordinary skill in the art.

While round belts have been discussed as compared with flat belts, the use of either flat belts or round belts is a matter of choice in the present invention. Any conveyor belts or means may be used, including V-belts, round belts, or flat belts, perforated belts, woven belts, chain-mesh belts, and the like. Furthermore, any belt materials can be used. Such materials include steel mesh, Teflon-coated materials, nylon, urethane, rubber, or the like.

Any control system can be used to actuate selectively the actuating members which are used in the present invention. Any and all actuating members capable of moving the diverting member 1 from one position to another are contemplated as being within the scope of the present invention. Furthermore, any selectively controllable control devices are contemplated as being within the scope of the present invention, and such control devices can be as discussed with respect to the signal processor 7, controller 28, and control device 30. Furthermore, any type of sensors can be used in determining which articles are to be diverted.

Articles useable with the present invention include any food products, including candy bars, cookies, cakes, pies, breads, as well as non-food articles such as bricks, pages, boxes, electrical circuits, or any other articles capable of being selectively diverted from one conveying means to another.

Also, although supply conveyor belts have been used for supplying articles to the diverting members shown in the present invention, other members can be used as well, such as a flat surface from which articles are pushed by articles behind the pushed articles, such as an accumulator station, as well as a chute wherein articles slide along the chutes to the diverting members, as well as any other supply means capable of supplying articles to the diverting members 1. The same is also true of the diverting member 600, namely that any supply member can be used and not just the conveyor 21 shown in Figure. Furthermore, any other conveying means can be used to receive articles conveyed by the diverting while the diverting member is in its bridging position, and not just the conveyor belt 19 of the figures. For example, a flat accumulator tray can be used or a sloping chute can be used permitting accumulated articles to slide therealong if such is desired. These and any other conveying means and devices can be used for supplying articles to the diverting members and for carrying articles away.

Figure 8:
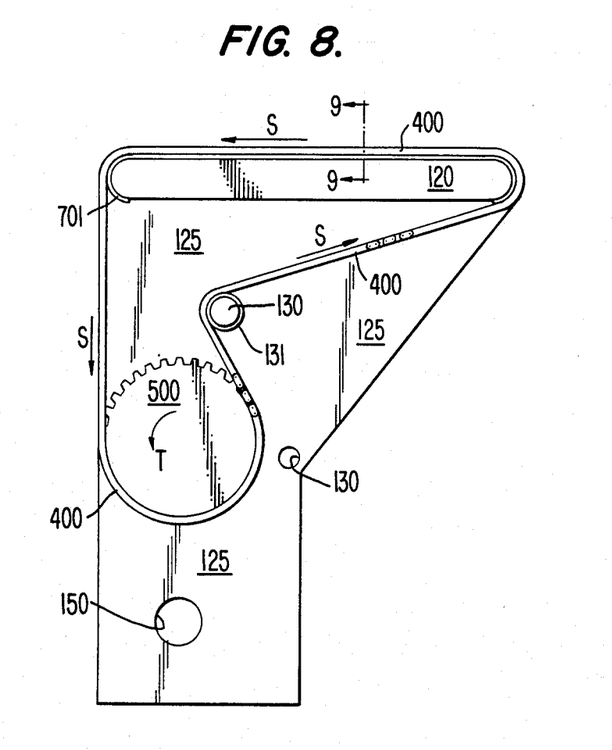
FIG. 8 is a front elevational view of an inventive chain support for use as a conveying apparatus.

FIG. 8 is a front elevational view of a support member 125 which is similar to that shown in FIG. 1 of the present invention. Here, instead of a roller, there is a sprocket gear 500 for engaging a chain 400. The chain 400 can be composed of links, such as is commonly used as a bicycle chain. In the embodiment shown in FIG. 8, there are no other rotating members supporting the chain 400. Rather, the chain 400 is slidably supported upon the reels 701 and 131 of the respective support members 120 and 130. The support member 120 has an upstanding raised rail 701. The round support member 130 has an upstanding raised ridge 131 therein. The apparatus shown in FIG. 8 is for a single chain. However, a pair of chains can also be used, in which case the second chain, and the second raised ridges corresponding to ridges 701 and 131 would be concealed from view in FIG. 8 by the first chain and supports for the first chain 400.

The support member 125 in FIG. 8 has an opening 150 for receiving a shaft therethrough. Also, a bore 130 is formed in the support member 125 for receiving a pin, so that a reciprocating member such as is shown in FIG. 1 can be attached therethrough. The support member 125 has an upstanding chain support portion 120 affixed thereto so that the upstanding support portion 120 moves with the support plate 125. The sprocket gear 500 is rotatably mounted to the support member 125. Such rotatable mounting is conventional and well-known in the gear arts.

Figure 9:
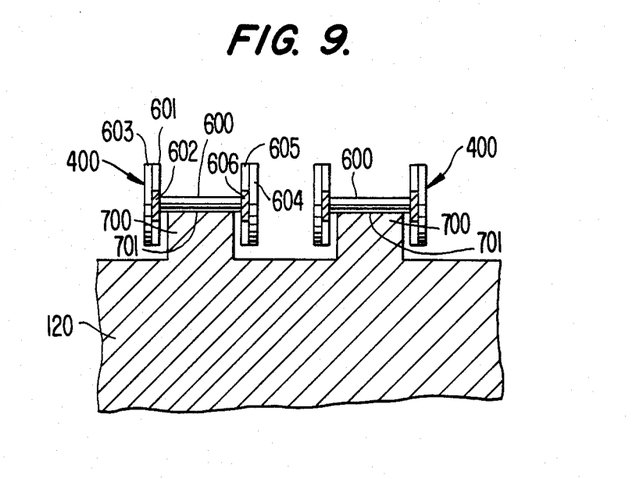
FIG. 9 is a sectional side view taken along line 9—9 of FIG. 8.

FIG. 9 is a side elevational view, taken in section, along line 9—9 of FIG. 8. Here, details of the chain 400 itself are visible. As seen, the chain links of the chain 400 are formed by an inside pair of connecting members 601 and 605 and by an outer pair of linked connecting members 603 and 604. A plurality of pins 600 are used to connect the chain links together and to ride upon the upper surface 701 of the guide 700. The pins 600 connect the link walls 603, 601, 605, and 604 to one another and separate these side walls from one another by a predetermined distance, as is conventional in the link-chain art, such chains being commonly found in bicycles, and other chain-driven apparatus.

As seen in FIG. 9, the lowermost edges of the sidewalls 603, 604, and 605 do not touch the uppermost surface of the block 120 due to the support of the pins 600 by the uppermost surface 701 of the upstanding guides 700. As seen in FIG. 9, a pair of such guides 700, 700 are used to support a pair of chains 400, 400.

It is contemplated as being within the scope of the present invention that any number of raised guides 700 could be used for supporting any number of chains 400. The materials preferably used for supporting the chain is Acetal, which is sold under a variety of commercial names and in a variety of grades. In particular, a suitable type of Acetal is sold under the tradenames of Lennite or Delrin. This type of plastic is sufficiently wear-resistant that the chain 400 slides thereover without wearing the plastic surface of the supports 120 or 130.

By the present invention a chain is used and supported in novel way rather merely by rollers, and such raised guides for supporting such a chain have advantages over the prior art which employs rollers. Where rollers are used for supporting a chain, the rollers can wear out, as can the axles supporting the rollers. Furthermore, the constant impact of the rollers against the different chain links as the chain moves at a predetermined velocity causes wear to both the chain and the roller surface. By the present invention, such wear is avoided and reliability is significantly increased.

Figure 10:
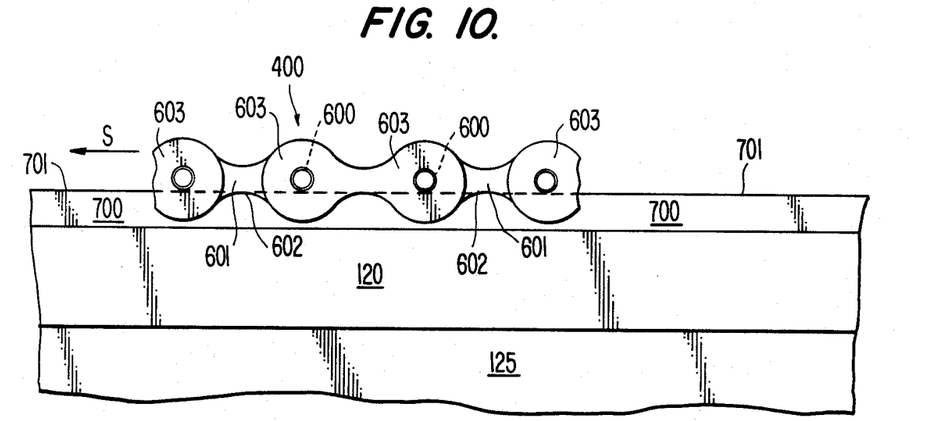
FIG. 10 is a side elevational view of the chain shown in FIG. 9 and the support and guide thereon.

FIG. 10 is a side elevational view showing the detailed structure of the chain links described with respect to FIG. 9 and showing the support upon the uppermost surface 701 of the guide 700. As seen in FIG. 10, the pins 600 ride along the surface 701, the chain 400 moving with a velocity S in FIG. 10.

Figure 11:
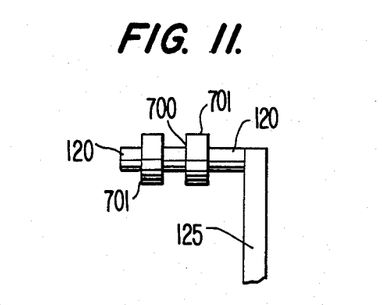
FIG. 11 is an end elevational view of the support according to the present invention with the chains removed.

FIG. 11 is a right-hand side elevational view of the support portion 120 and support plate 125 as seen in elevation view without any chains thereon. As seen, the upstanding guide surfaces 701 and the upstanding guides 700 are clearly seen in this Figure as being curved about the end portions of the support 120. Also, as seen in FIG. 11, the support portion 120 is fixedly connected to the support plate 125. In a preferred embodiment, the support plate 125 is integrally molded or cast together with the support portion 120. Alternatively, the support plate 125 and support 120 can be machined from a solid block of material as described above, or the support member 120 can be attached as by screws, bolts, or the like to the support plate 125.

It is contemplated as being within the scope of the present invention to provide that only the upstanding support portions 700, having uppermost surfaces 701, and the upstanding guide 131 of the support portion 130 of FIG. 8 of the Acetal material used. As described above, preferred commercial varieties of such plastic are known as Lennite or Delrin. Such a plastic is a hard plastic and resists wear.

Figure 12:
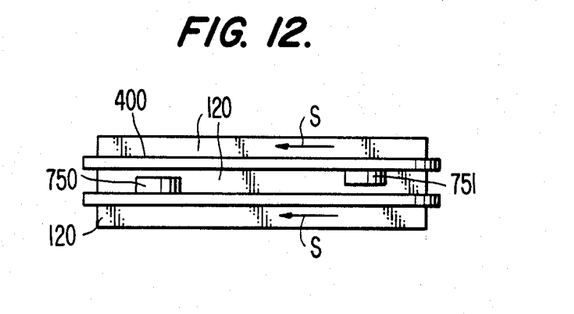
FIG. 12 is a top elevational view of the chain support 120, showing a pair of support cleaning elements 750, 751 associated with each respective chain 400.

FIG. 12 is a top elevational view of the chain support 120, showing a pair of support cleaning elements 750, 751 associated with each respective chain 400.

The cleaning elements 750, 751 are staggered, and because each chain moves at the same speed S, the cleaning elements 750, 751 do not collide. Each element 750, 751 is preferably another link of chain attached to the side of the respective chain 400. Alternatively, any other attachable member can be used to clean the support 120 of detritus and debris.

The improved selective diverting devices of the present invention are capable of achieving the above-enumerated advantages and results, and while preferred embodiments of the present invention have been disclosed, it will be understood that it is not limited thereto but may be otherwise embodied within the scope of the following claims.

What is claimed is:

1. A diverting device for selectively diverting articles from a conveyor belt path to another location which is below the conveyor belt path, comprising:
    a drive means,
    a plurality of support members rotatably connected to said drive means,
    a conveying means operatively attached to each support member,
    said conveying means including a chain slidably supported along a portion of a path of travel over a support surface and
    an actuating means for selectively moving each support member between a first position and a second position,
    such that articles are diverted from the conveyor belt path to the other location which is below the conveyor belt path when said support member is in said second position, wherein
    said drive means is in driving relationship with a driven member supported by each support member while said support member is in said first position and while said support member is in said second position, and said drive means is in driving engagement with said driven member at all times;
    said actuating means includes a member movable between two positions;
    said conveying means includes a guide ridge supporting a chain;
    said guide ridge is connected to said support member;
    said chain forms a continuous loop;
    said drive means includes a rotatable shaft;
    said rotatable shaft being located outside said continuous loop, such that said chain can be replaced without disassembly of said support member from said rotatable shaft;
    each driven member includes driven gear; each said driven gear is driven by a respective one of a plurality of driving gears fixed to said rotatable shaft, and
    adjacent support members are closely nested such that a gap exists between adjacent support members sufficient to replace the chains without removal of any support plate from said rotatable shaft.

2. A diverting device as claimed in claim 1, wherein said conveying means includes at least one cleaning link.

3. A diverting device as claimed in claim 1, wherein said conveying means includes a sprocket which is rotatable relative to said support member,
    said sprocket driving the conveyor chain.

4. A diverting device as claimed in claim 1, wherein said actuating means is a pneumatic cylinder.

5. A diverting device as claimed in claim 4, wherein said pneumatic cylinder is selectively actuable between an extended position and a retracted position;
    said pneumatic cylinder being double-acting to exert a positive force in moving in either direction between said extended and retracted positions.

6. A diverting device as claimed in claim 1, wherein said driven gear is a toothed gear,
    and said drive means includes a toothed gear which is in driving engagement with said driven gear at all times.

7. A diverting device as claimed in claim 1, wherein said chain has a plurality of links.

8. A diverting device as claimed in claim 1, wherein said chain has an additional side link for cleaning said guide ridge.

9. A diverting device for selectively diverting articles from a conveyor belt path to another location which is substantially directly below the conveyor belt path, comprising:

a drive means, a plurality of support members rotatably connected to said drive means, a conveying means operatively attached to each support member, said conveying means including a plurality of chains slidably supported along a portion of a path of travel over a support surface, an actuating means for selectively moving each support member between a first position and a second position, such that articles are diverted from the conveyor belt path to the other location which is substantially below the conveyor belt path when said support member is in said second position, wherein said drive means is in driving relationship with a driven member supported by each support member while said support member is in said first position and while said support member is in said second position, and said drive means is in driving engagement with said driven member at all times, said actuating means including a member movable between the positions;

said conveying means includes a plurality of guide ridges corresponding to the number of said chains and supporting said chains;

said guide ridges are connected to said support member;

each chain forms a continuous loop;

said drive means includes a rotatable shaft;

said rotatable shaft is located outside said continuous loop, such that said chains may be replaced without disassembly of said support member from said rotatable shaft;

each driven member includes a driven gear, each said driven gear being driven by a respective one of a plurality of driving gears fixed to said rotatable shaft, and adjacent support members are closely nested such that a gap exists between adjacent support members sufficient to replace the chains without removal of any support member from said rotatable shaft.

10. A diverting device as claimed in claim 9, wherein said conveying means includes at least one cleaning link.

11. A diverting device as claimed in claim 9, wherein said conveying means includes a plurality of sprockets corresponding to the number of said chains which are rotatable relative to said support member, said sprockets driving the conveyor chains.

12. A diverting device as claimed in claim 9, wherein said actuating means is a pneumatic cylinder.

13. A diverting device as claimed in claim 12, wherein said pneumatic cylinder is selectively actuable between an extended position and retracted position, said pneumatic cylinder being double-acting to exert a positive force in moving in either direction between positions.

14. A diverting device as claimed in claim 9, wherein said driven gear is a toothed gear, and said drive means includes a toothed gear which is in driving engagement with said driven gear at all times.

15. A diverting device as claimed in claim 9, wherein each chain has a plurality of links.

16. A diverting device as claimed in claim 9, wherein each chain has an additional side link for cleaning the corresponding guide ridge.

* * * * *